(12) United States Patent
Hutter et al.

(10) Patent No.: US 12,307,000 B2
(45) Date of Patent: May 20, 2025

(54) SHARE DOMAIN ARRANGEMENTS FOR MASKED HARDWARE IMPLEMENTATIONS

(71) Applicant: Cryptography Research, Inc., San Jose, CA (US)

(72) Inventors: Michael Hutter, Vienna (AT); Helena Handschuh, Palo Alto, CA (US); Scott C. Best, Palo Alto, CA (US)

(73) Assignee: Cryptography Research, Inc., San Jose, CA (US)

( * ) Notice: Subject to any disclaimer, the term of this patent is extended or adjusted under 35 U.S.C. 154(b) by 248 days.

(21) Appl. No.: 17/780,428

(22) PCT Filed: Nov. 30, 2020

(86) PCT No.: PCT/US2020/062553
§ 371 (c)(1),
(2) Date: May 26, 2022

(87) PCT Pub. No.: WO2021/118816
PCT Pub. Date: Jun. 17, 2021

(65) Prior Publication Data
US 2023/0016420 A1    Jan. 19, 2023

Related U.S. Application Data

(60) Provisional application No. 62/946,133, filed on Dec. 10, 2019.

(51) Int. Cl.
*G06F 21/75* (2013.01)
*H04L 9/00* (2022.01)
(Continued)

(52) U.S. Cl.
CPC ............ *G06F 21/755* (2017.08); *H04L 9/003* (2013.01); *G06F 21/75* (2013.01); *H04L 9/002* (2013.01); *H04L 9/0662* (2013.01)

(58) Field of Classification Search
CPC ....... G06F 21/75; G06F 21/755; H04L 9/002; H04L 9/003; H04L 9/0662
See application file for complete search history.

(56) References Cited

U.S. PATENT DOCUMENTS 9,143,325 B2 * 9/2015 Chen ................... G06F 7/724
2011/0261953 A1 * 10/2011 Guilley ............ G01R 31/31719
380/2

(Continued)

FOREIGN PATENT DOCUMENTS

WO    WO-2007012102 A2 *  2/2007  .............. G06F 7/00
WO    WO-2010011399 A2 *  1/2010  .............. G06F 21/75

OTHER PUBLICATIONS

"Domain-Oriented Masking: Compact Masked Hardware Implementations with Arbitrary Protection Order"—Gross et al, Institute for Applied Information Processing and Communications (IAIK), Graz University of Technology, Sep. 2016 https://eprint.iacr.org/2016/486 (Year: 2016).*

(Continued)

*Primary Examiner* — Randy A Scott
(74) *Attorney, Agent, or Firm* — The Neudeck Law Firm, LLC

(57) ABSTRACT

Hardware masking may be used as a countermeasure to make power analysis attacks more difficult. Masking attempts to decouple the secret and/or processed values of a cryptographic algorithm from its intermediate values. One method of masking probabilistically splits each bit of a computation into multiple shares. Mask-share domains (i.e., the wires and gates that perform a computation on a share) are physically spaced to reduce coupling between mask-share domains. The mask-share domains may be connected to the same power supply network. The physical distance between mask-share domains along the power-supply network may be selected to reduce coupling between mask-share domains that may occur via the power supply network. The mask-share domains may each be connected to different on-chip power supply networks.

20 Claims, 12 Drawing Sheets

(51) Int. Cl.
　　　*H04L 9/06*　　　　(2006.01)
　　　*H04L 9/08*　　　　(2006.01)

(56) References Cited

U.S. PATENT DOCUMENTS

2014/0006797 A1\*　1/2014　Cordella ............ G06F 12/1408
　　　　　　　　　　　　　　　　　　　　　　　　　　　713/189
2016/0148680 A1　　5/2016　Yoshimoto et al.
2019/0379529 A1\*　12/2019　Meyer .................... H04L 9/008

OTHER PUBLICATIONS

"An Overview of Hardware-Level Statistical Power Analysis Attack Countermeasures"—Mayhew et al, Journal of Cryptographic Engineering, Oct. 28, 2014 https://link.springer.com/article/10.1007/s13389-016-0133-6 (Year: 2016).\*

Notification of Transmittal of the International Search Report and the Written Opinion of the International Searching Authority, or the Declaration with Mail Date Feb. 25, 2021 re: Int'l Appln. No. PCT/US2020/062553. 7 pages.

\* cited by examiner

SHARE DOMAIN ARRANGEMENTS FOR MASKED HARDWARE IMPLEMENTATIONS

DETAILED DESCRIPTION OF THE EMBODIMENTS

Hardware masking is a countermeasure that may be used to make power analysis attacks more difficult. Masking attempts to decouple the secret and/or processed values of a cryptographic algorithm from its intermediate values. One method of masking is to probabilistically split each bit of a computation into multiple "shares". Because the values of the shares are the result of a random operation, each share bit does not yield information about the original bit. Computations may then be performed on the individual bit shares without revealing information about the original bit. The circuitry (i.e., transistors, gates, doped regions, metal interconnect layers, etc.) that perform computations on individual share bits is referred to herein as a "mask-share domain".

In an embodiment, each mask-share domain is physically spaced from the other mask-share domains to reduce electromagnetic coupling between elements (circuitry) of different mask-share domains. In another embodiment, the mask-share domains are connected to the same power supply network. The physical distance between mask-share domains along the power supply network is selected to reduce coupling between mask-share domains that may occur via the power-supply network. In another embodiment, the mask-share domains are each connected to different on-chip power supply networks.

Figure 1:
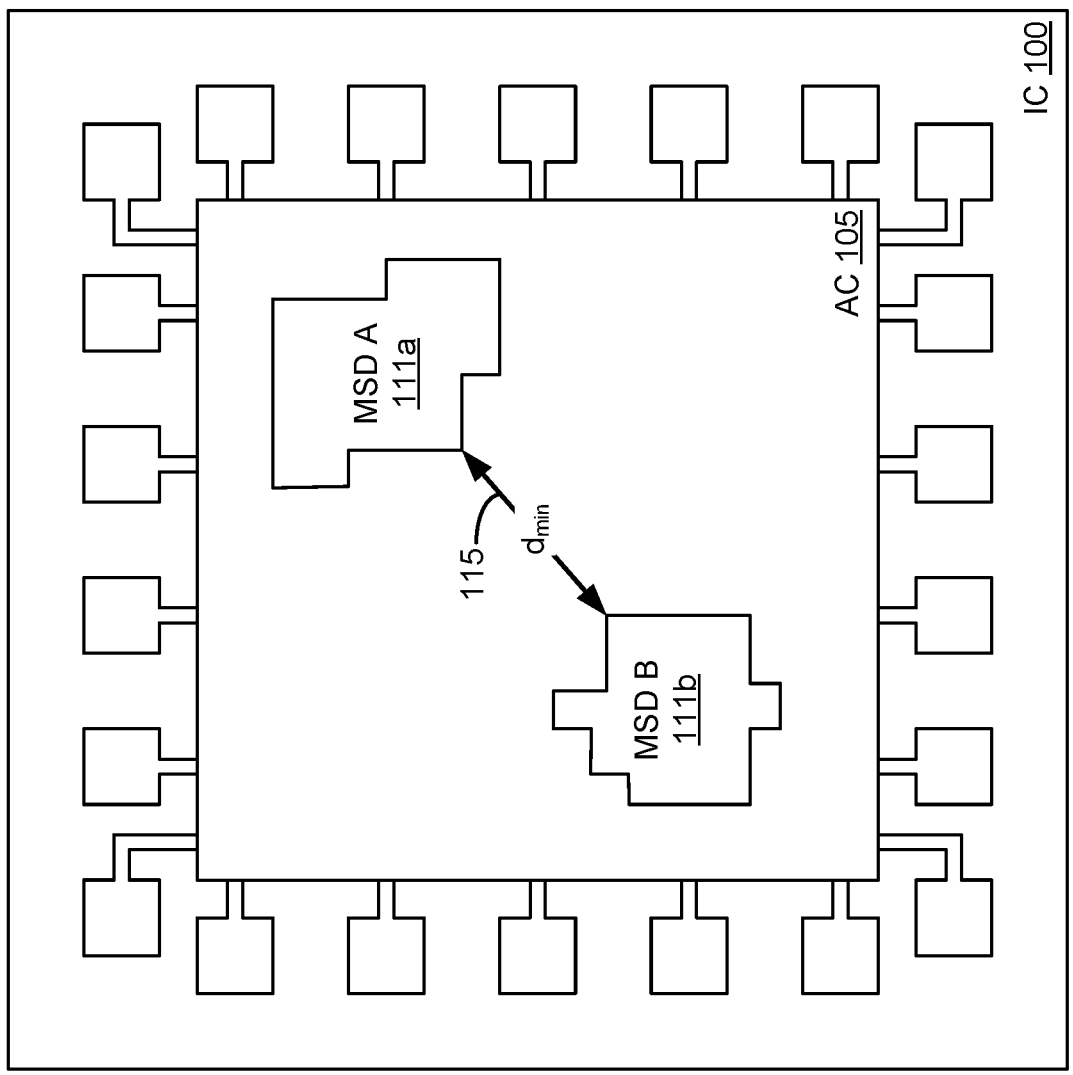
FIG. 1 is an illustration of an integrated circuit that includes multiple mask-share domains.

FIG. 1 is an illustration of an integrated circuit that includes multiple mask-share domains ("MSD"). In FIG. 1, integrated circuit 100 includes active circuitry 105. Active circuitry 105 includes at least mask-share domain A 111a and mask-share domain B 111b. Mask-share domain A 111a is physically spaced apart from all of the circuitry of mask-share domain B 111b by a minimum distance of $d_{min}$ 115. This spacing is done in order to reduce the (electromagnetic) coupling between nodes in mask-share domain A 111a and nodes in mask-share domain B 111b.

In an embodiment, minimum distance of $d_{min}$ 115 provides benefit when mask-share domain A 111a and mask-share domain B 111b are operated concurrently, such that the amount of electromagnetic cross-coupling between mask-share domain A 111a and mask-share domain B 111b—cross-coupling that transfers a significant amount of statistical information between mask-share domain A 111a and mask-share domain B 111b—is below a selected threshold. In other words, since cross-coupling between mask-share domain A 111a and mask-share domain B 111b cannot be completely eliminated, minimum distance of $d_{min}$ 115 is selected to meet an information transfer goal. This goal may be, for example, the number of power-supply traces required (e.g., using differential power-analysis techniques) to reconstruct the unshared (i.e., original or unmasked) value.

The minimum distance of $d_{min}$ 115 may be ensured in a variety of ways familiar to those skilled in the art of chip design, including by manual layout and/or automated place-and-route software. For example, in an embodiment, the minimum distance of $d_{min}$ 115 may be ensured by specifying minimum distance of $d_{min}$ 115 as a design rule enforced by automated place and route software and then checked by automated design rule checking software.

Figure 2:
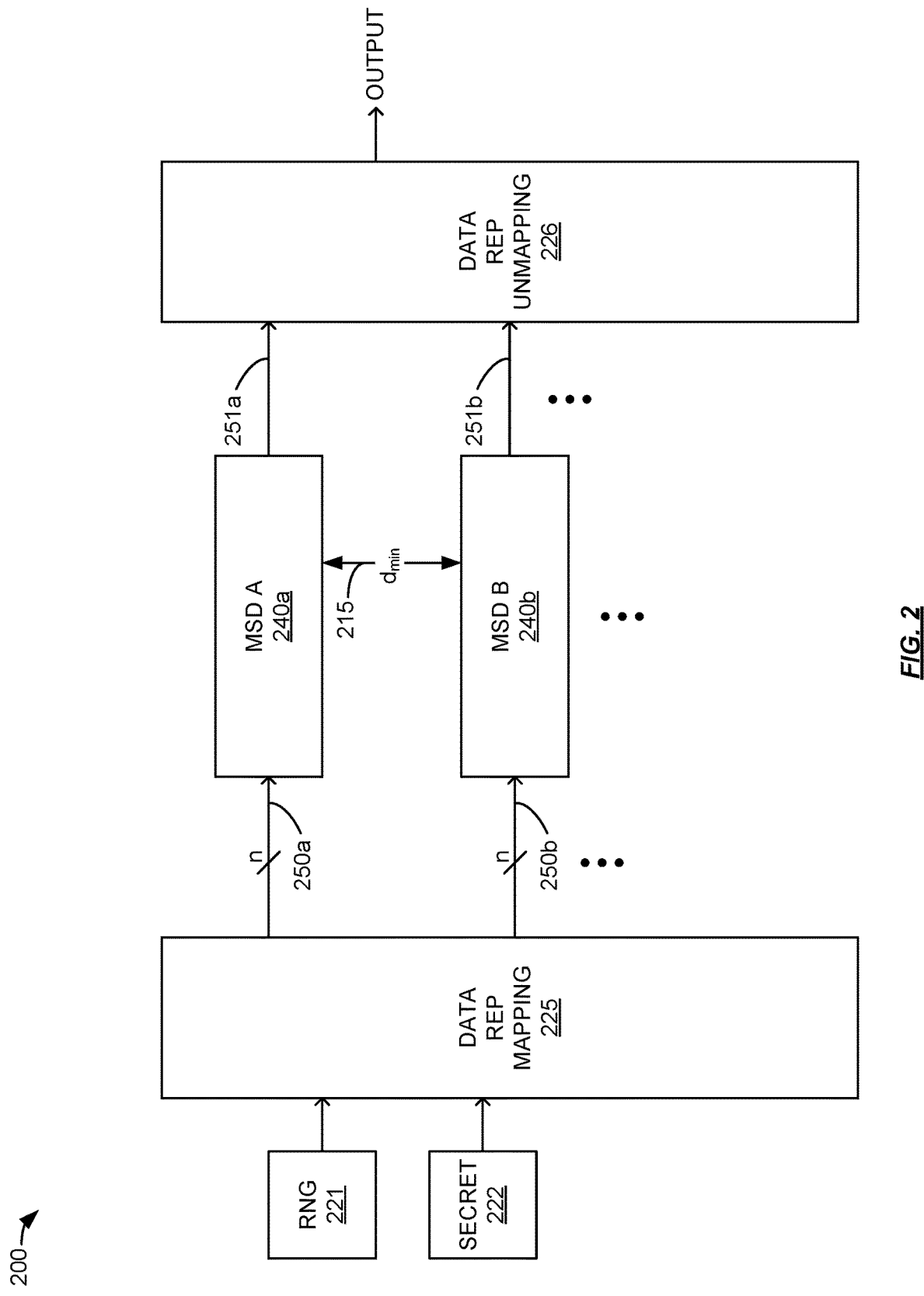
FIG. 2 is a block diagram illustrating multiple mask-share domains.

FIG. 2 is a block diagram illustrating multiple mask-share domains. In FIG. 2, masked computation system 200 comprises random number generator 221, secret value 222, data representation mapping 225, mask-share domain A 240a, mask-share domain B 240b, and data representation unmapping 226. Random number generator 221 is operatively coupled to data representation mapping 225. Secret value 222 (i.e., unmasked data representation) is operatively coupled to data representation mapping 225. Data representation mapping 225 provides mask-share domain A 240a with an n-bit share value 250a (i.e., masked data representation.). Data representation mapping 225 provides mask-share domain B 240b with an n-bit share value 250b (i.e., masked data representation.). Mask-share domain A 240a provides the results 251a of a computation performed using share value 250a to data representation unmapping 226. Mask-share domain B 240b provides the results 251b of a computation performed using share value 250b to data representation unmapping 226. The circuitry of mask-share domain A 240a and mask-share domain B 240b are physically separated from each other on chip by a minimum distance $d_{min}$ 215.

Based on input from random number generator 221, secret value 222 is split into multiple share values 250a through 250b. It should be understood that although FIG. 2 specifically illustrates two share values 250a-250b, any integer number of share values 250a-250b larger than 1 may be selected. A common mapping is Boolean masking. In an embodiment, Boolean masking randomly splits secret value 222 into a set of share values 250a and 250b such that: (1) the shares exclusive-OR (XOR) with each other to the secret value 222; and, (2) no proper subset of share values 250a or 250b gives any non-random statistical information about secret value 222.

Another mapping is Arithmetic mapping. In an embodiment, arithmetic mapping splits a k-bit secret value 222 into share values 250a and 250b such that: (1) share values 250a and 250b arithmetically sum to secret value 222; and, (2) no proper subset of share values 250a or 250b gives any non-random statistical information about secret value 222.

Other mappings such as "multiplicative mapping", "affine mapping", etc., either alone or in combination, are contemplated.

The respective results 251a and 251b of computations by mask-share domains 240a and 240b are provided to data representation unmapping 226. Data representation unmapping 226 uses results 251a and 251b to output an unmasked (or unmapped) version of results 251. Again, although the figure implies demonstrates the concept for two share values, any integer number larger than 1 can be considered.

Figure 3:
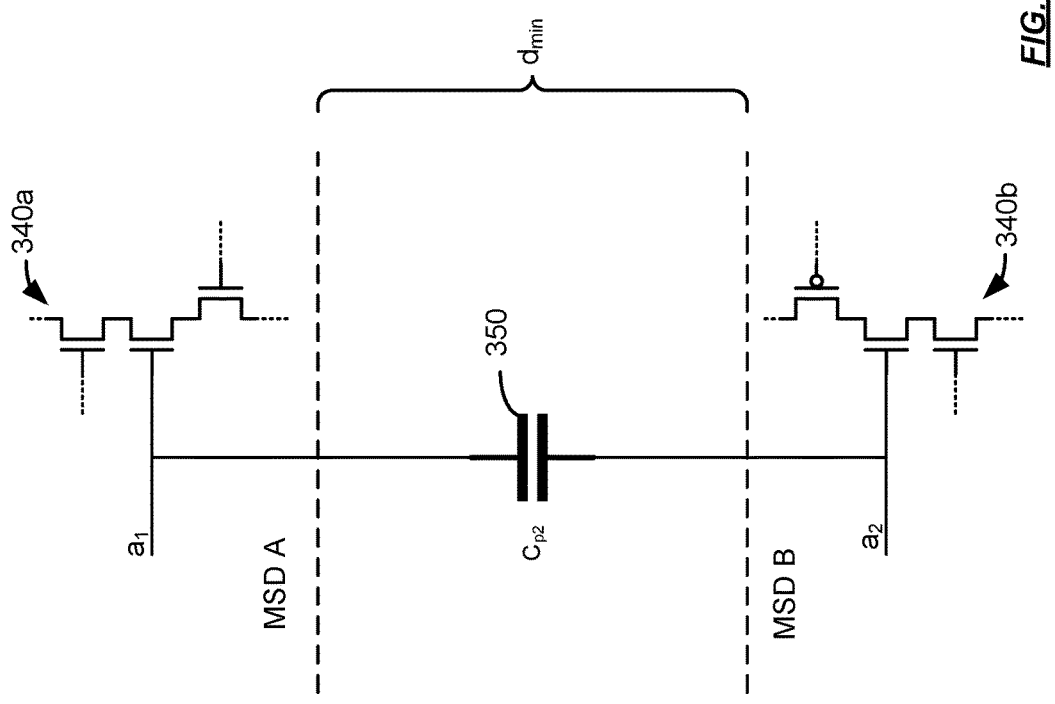
FIG. 3 is an illustration of the concept of cross-coupling between mask-share domains.
Figure 3:
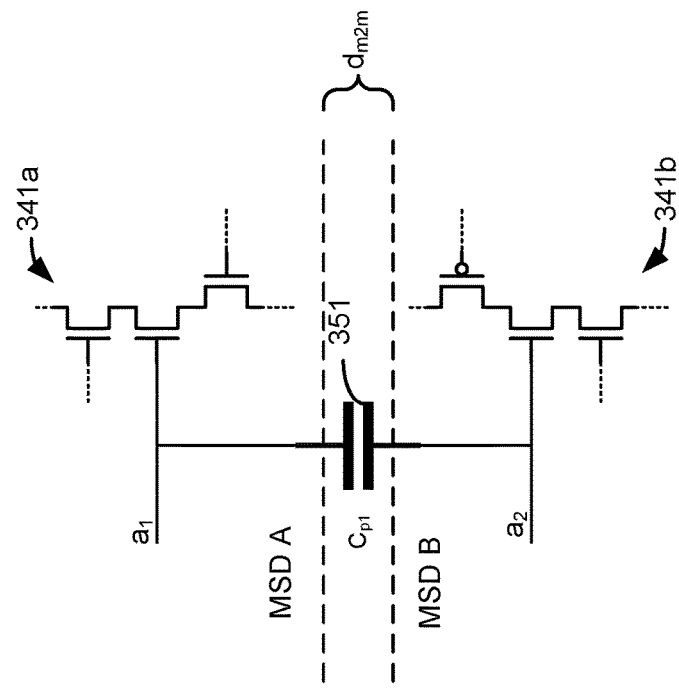

FIG. 3 is an illustration of the concept of cross-coupling between mask-share domains. The left side of FIG. 3 illustrates mask-share domain A circuitry 341a and mask-share domain B circuitry 341b. The right side of FIG. 3 illustrates mask-share domain A circuitry 340a and mask-share domain B circuitry 340b.

On the left side of FIG. 3, mask-share domain A circuitry 341a includes node $a_1$. Mask-share domain B circuitry 341b includes node $a_2$. Because mask-share domain A circuitry and mask-share domain B circuitry are not subject to a minimum distance rule between mask-share domains, node $a_1$ of mask-share domain A may be as close to node $a_2$ of mask-share domain B as the minimum metal-to-metal spacing ($d_{m2m}$) allowed by the integrated circuit manufacturing process. This minimum spacing results in the maximum amount of parasitic capacitance between node $a_1$ and node $a_2$ of $C_{p1}$ 351 as illustrated in FIG. 3.

On the right side of FIG. 3, mask-share domain A circuitry 340a includes node $a_1$. Mask-share domain B circuitry 340b includes node $a_2$. Because mask-share domain A circuitry and mask-share domain B circuitry are subject to a minimum distance rule of $d_{min}$ between mask-share domains, node $a_1$ of mask-share domain A circuitry 340a may only be as close to node $a_2$ of mask-share domain B circuitry 340b as $d_{min}$. This larger spacing results in a smaller parasitic capacitance between node $a_1$ and node $a_2$ of $C_{p2}$ 350 as illustrated in FIG. 3. It should understood that since the capacitance between two conductors is inversely proportional to the distance between the conductors, when $d_{min}$ is selected to be much greater than $d_{m2m}$ (i.e., $d_{min} \gg d_{m2m}$), then parasitic capacitance $C_{p2}$ is much smaller than parasitic capacitance $C_{p1}$ (i.e., $C_{p2} \ll C_{p1}$). The smaller the coupling capacitance ($C_{p1}$, $C_{p2}$) between nodes $a_1$ and $a_2$, the less information is transferred between nodes $a_1$ and $a_2$ and therefore the less information is transferred between mask-share domain A and mask-share domain B.

Figure 4A:
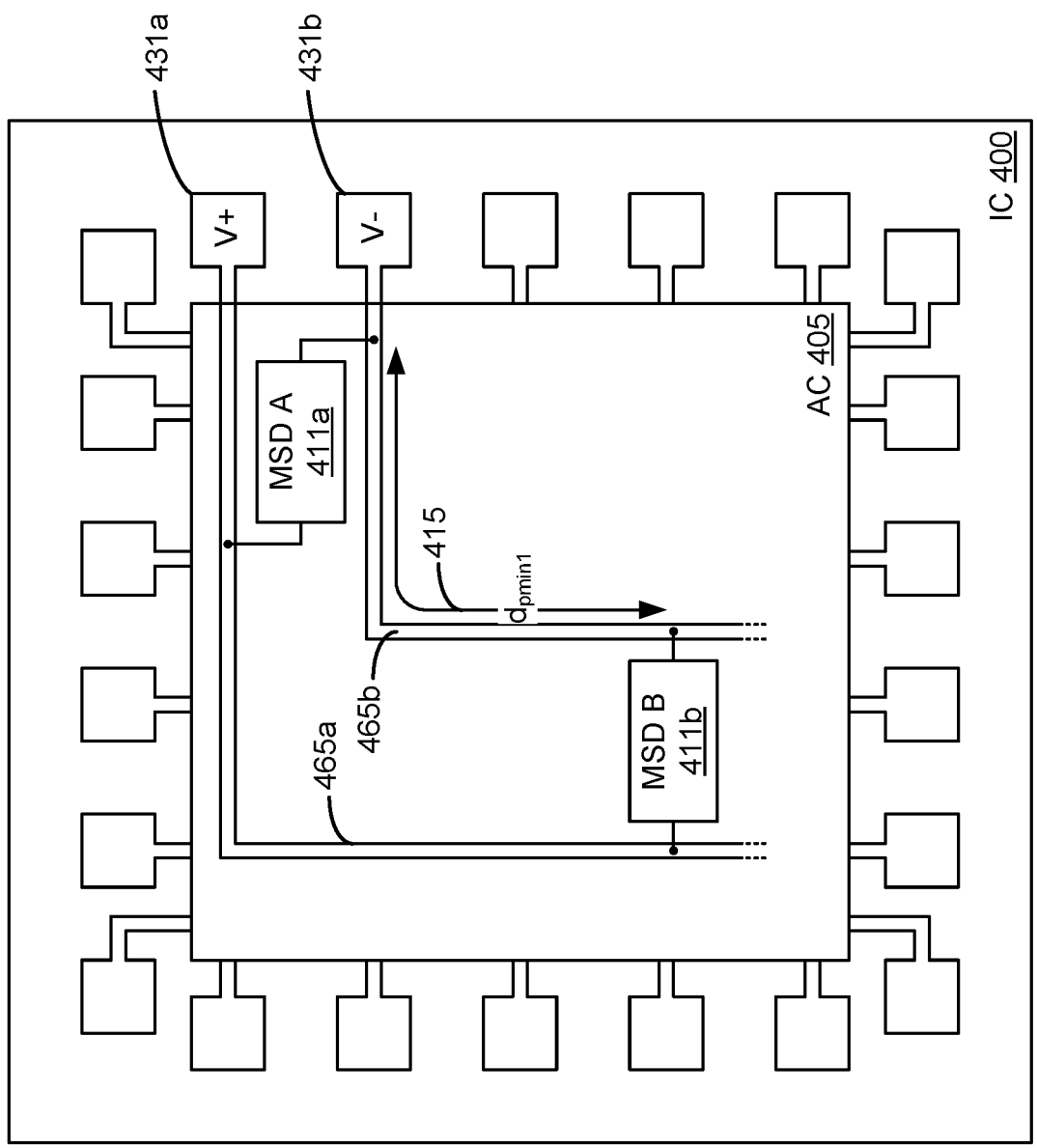
FIG. 4A is an illustration of an integrated circuit power supply network with multiple mask-share domains.

FIG. 4A is an illustration of an integrated circuit power-supply network with multiple mask-share domains. In FIG. 4A, integrated circuit 400 includes active circuitry 405. Active circuitry 405 includes at least mask-share domain A 411a and mask-share domain B 411b. Mask-share domain A 411a and mask-share domain B 411b are connected to power supply network 465a-465b. Positive power supply network 465a receives a positive supply voltage V+ via power supply pad 431a. Negative power supply network 465b receives a negative supply voltage (or ground) V− via power supply pad 431b. Thus, the power supply pads 431a-431b form a power supply pad set that is connected to power supply network 465a-465b.

Power supply network 465a-465b is connected to mask-share domain A 411a and mask-share domain B 411b at different locations of power supply network 465a-465b. In particular in FIG. 4A, mask-share domain A 411a is shown connected closer to the negative power supply pad 431b than mask-share domain B 411b, by a distance of $d_{pmin1}$ 415 measured along the shortest path along negative power supply network 465b.

As described in regards to FIG. 1 and FIG. 2, mask-share domain A 411a is physically spaced apart, from all of the circuitry of mask-share domain B 411b by the minimum distance of $d_{pmin1}$ 415 in order to reduce electromagnetic signal coupling between mask-share domain A 411a and mask-share domain B 411b. However, in FIG. 4A there is now shown a power-supply network in common between the two share domains.

In an embodiment, when mask-share domain A 411a and mask-share domain B 411b are operated concurrently, because they share a common on-chip power-supply network 465a-465b it is possible that a significant amount of statistical information can be communicated between mask-share domain A 411a and mask-share domain B 411b that exceeds a preferred threshold. In other words, since mask-share domain A 411a and mask-share domain B 411b are both connected to power supply network 465a-465b, coupling between mask-share domain A 411a and mask-share domain B 411b via power supply network 465a-465b cannot be completely eliminated. Thus, the minimum distance of $d_{pmin1}$ 415 is selected to meet an information transfer goal. This goal may be, for example, the number of traces required to reconstruct an unshared (i.e., original or unmasked) value.

The minimum distance of $d_{pmin1}$ 415 may be ensured in a variety of ways familiar to those skilled in the art of chip design, including by manual layout and/or automated place-and-route software. For example, in an embodiment, the minimum distance of $d_{pmin1}$ 415 may be ensured by specifying minimum distance of $d_{pmin1}$ 415 as a design rule enforced by automated place and route software and then checked by automated design rule checking software.

Figure 4B:
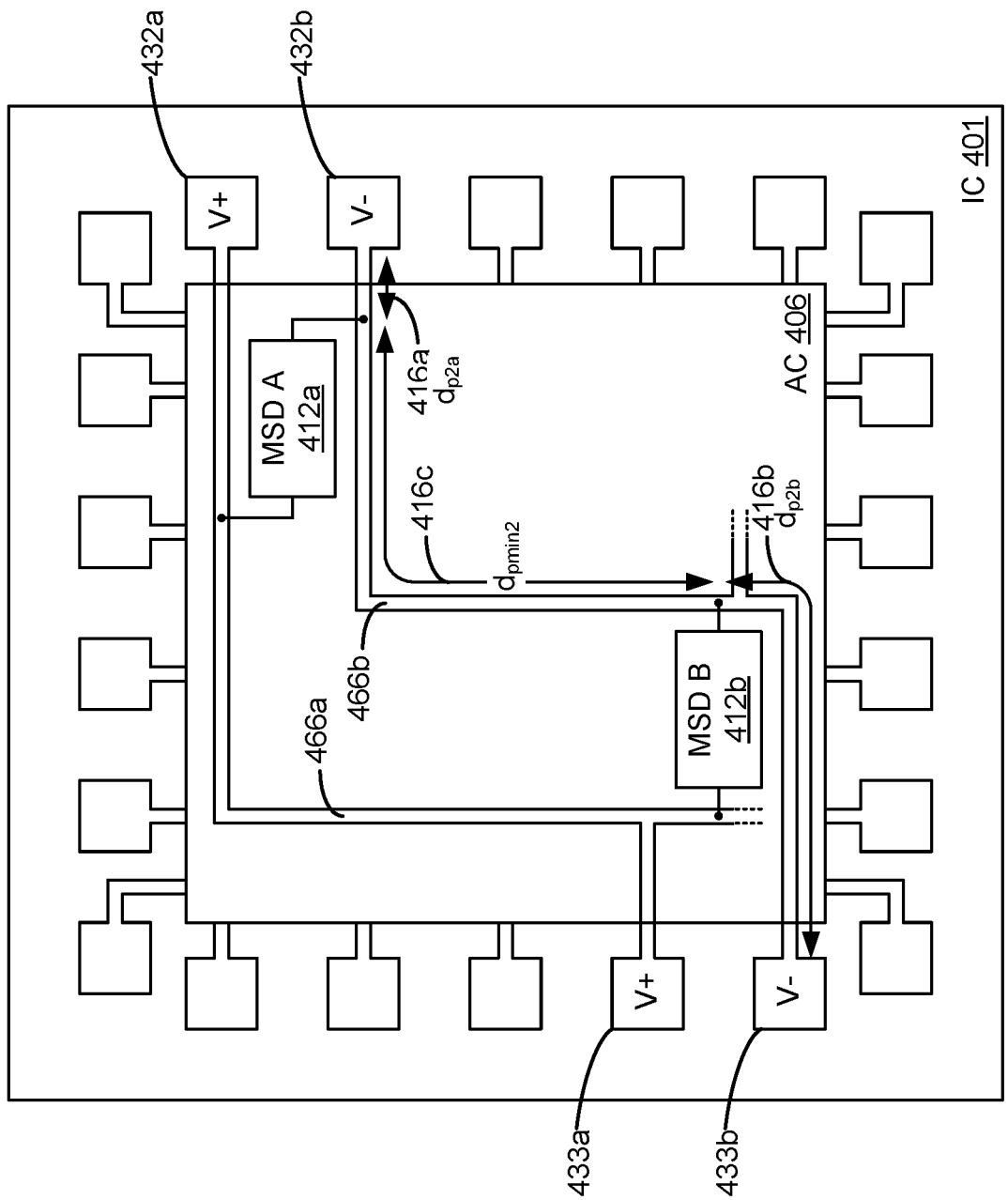
FIG. 4B is an illustration of an integrated circuit power supply network with multiple mask-share domains and multiple sets of power supply pads.

FIG. 4B is an illustration of an integrated circuit power supply network with multiple mask-share domains and multiple sets of power-supply pads. In FIG. 4B, integrated circuit 401 includes active circuitry 406. Active circuitry 406 includes at least mask-share domain A 412a and mask-share domain B 412b. Mask-share domain A 412a and mask-share domain B 412b are connected to power supply network 466a-466b. Positive power supply network 466a receives a positive supply voltage V+ via power-supply pad 432a and power-supply pad 433a. Negative power supply network 466b receives a negative supply voltage (or ground) V− via power supply pad 432b and power-supply pad 433b. Thus, power supply network 466a-466b is connected to two power-supply pad sets 432a-432b and 433a-433b.

Power supply network 466a-466b is connected to mask-share domain A 412a and mask-share domain B 412b at different locations of power supply network 466a-466b. In particular in FIG. 4B, mask-share domain A 412a is connected to positive power supply network 466a at a distance of $d_{p2a}$ 416a from power supply pad 432a when measured along the shortest path along positive power supply network 466a. Mask-share domain B 412b is connected to negative power supply network 466b at a distance of $d_{p2b}$ 416b from power supply pad 433b when measured along the shortest path along negative power supply network 466b. Mask-share domain A 412a is connected to negative power supply network 432b at a distance of $d_{pmin2}$ to the connection of mask-share domain B 412b to power supply network 466b, when measured along the shortest path along negative power supply network 466b between mask-share domain A 412a and mask-share domain B 412b.

Mask-share domain A 412a is physically spaced apart, as measure along the shortest path of power supply network 466a-466b, from all of the circuitry of mask-share domain B 412b by the minimum distance of $d_{pmin2}$ 416c in order to reduce the signal coupling via the power supply network 466a-466b between nodes in mask-share domain A 412a and nodes in mask-share domain B 412b.

In an embodiment, when mask-share domain A 412a and mask-share domain B 412b are operated concurrently, because they share a common on-chip power-supply network 466a-466b it is possible that a significant amount of statistical information can be communicated between mask-share domain A 412a and mask-share domain B 412b that exceeds a preferred threshold. In other words, since mask-share domain A 412a and mask-share domain B 412b are both connected to power supply network 466a-466b, coupling between mask-share domain A 412a and mask-share domain B 412b via power supply network 466a-466b cannot be completely eliminated. Thus, a minimum distance of $d_{pmin2}$ 416c is selected to meet an information transfer goal. This goal may be, for example, the number of power-consumption (or electromagnetic) traces required to reconstruct an unshared (i.e., original or unmasked) value. It should be understood that the selection of $d_{pmin2}$ 416c may be based on the distance $d_{p2a}$ 416a along negative power supply network 466b from mask-share domain A 412a to power supply pad 432a, the distance $d_{p2b}$ 416b along positive power supply network 466b from mask-share domain B 412b to power supply pad 433b, or a combination of both.

The minimum distance of $d_{pmin2}$ 416c may be ensured in a variety of ways familiar to those skilled in the art of chip design, including by manual layout and/or automated place-and-route software. For example, in an embodiment, the minimum distance of $d_{pmin2}$ 416c may be ensured by specifying minimum distance of $d_{pmin2}$ 416c as a design rule enforced by automated place and route software and then checked by automated design rule checking software.

Figure 4C:
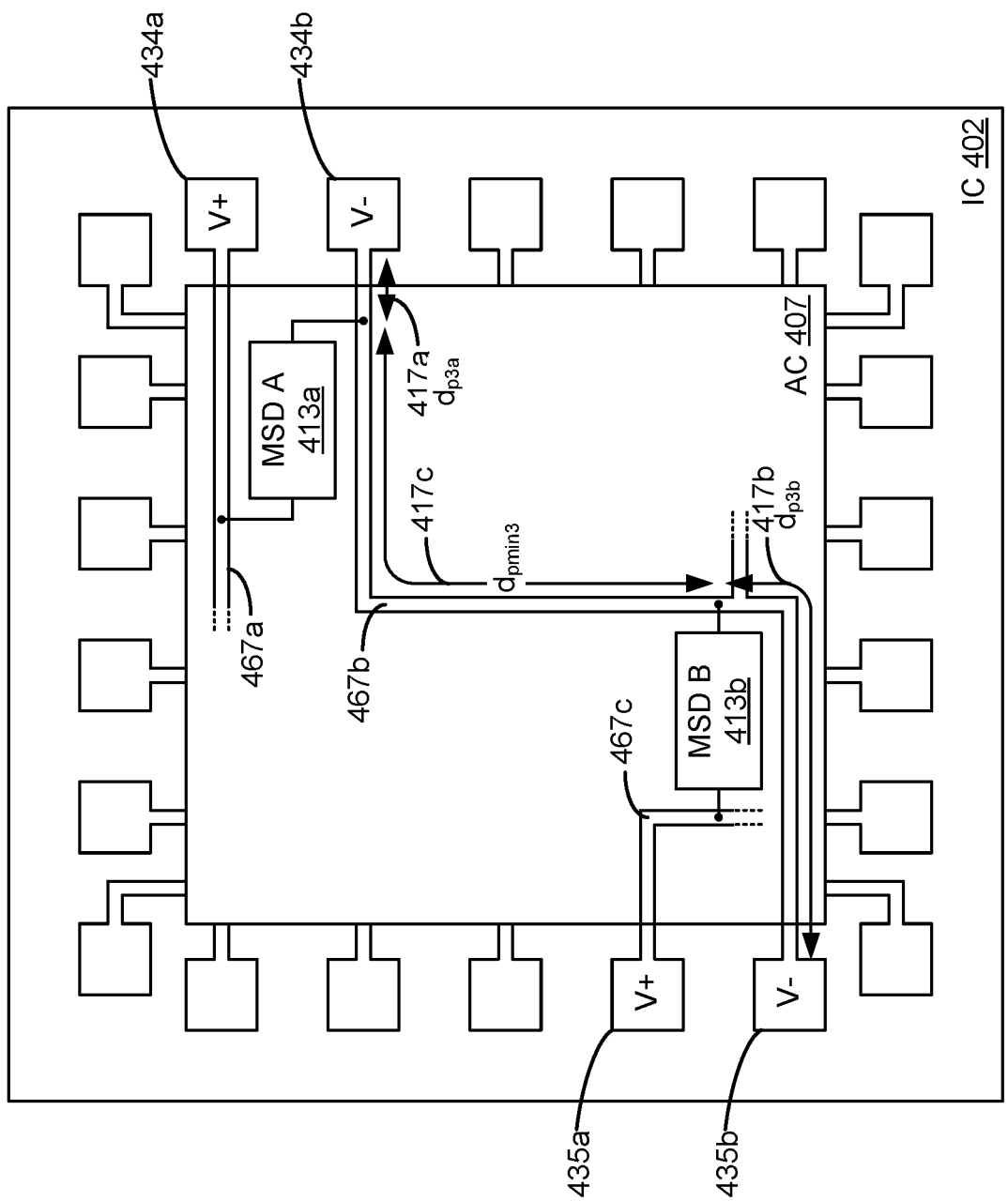
FIG. 4C is an illustration of an integrated circuit power supply network with multiple mask-share domains and partially split power-supply networks.

FIG. 4C is an illustration of an integrated circuit power supply network with multiple mask-share domains and partially split power-supply networks. In FIG. 4C, integrated circuit 402 includes active circuitry 407. Active circuitry 407 includes at least mask-share domain A 413a and mask-share domain B 413b. Mask-share domain A 413a is connected to positive on-chip power supply network 467a and negative on-chip power supply network 467b. Mask-share domain B 413b is connected to positive on-chip power supply network 467c and negative on-chip power supply network 467b. Thus, mask-share domain A 413a is connected to a different positive power supply network 467a than mask-share domain B 413b—which is connected to positive power supply network 467c.

Positive power supply network 467a receives a positive supply voltage V+ via power-supply pad 434a. Positive power supply network 467c receives the positive supply voltage V+ via power-supply pad 435a. Power-supply pad 434a may be connected to power supply pad 435a external to integrated circuit 402. Power-supply pad 434a may be connected to power supply pad 435a external to on-chip bypassing and/or the package of integrated circuit 402.

Negative power supply network 467b receives a negative supply voltage (or ground) V− via power supply pad 434b and power-supply pad 434b. Thus, negative power supply network 467b is connected to multiple negative power-supply pads 434b-435b.

Negative power supply network 467b is connected to mask-share domain A 413a and mask-share domain B 413b at different locations of negative power supply network 467b. In particular in FIG. 4C, mask-share domain A 413a is connected to negative power supply network 467b at a distance of $d_{p3a}$ 417a from power supply pad 434b when measured along the shortest path along negative power supply network 466b. Mask-share domain B 413b is connected to negative power supply network 467b at a distance of $d_{p3b}$ 417b from power supply pad 435b when measured along the shortest path along negative power supply network 467b. Mask-share domain A 413a is connected to negative power supply network 467b at a distance of $d_{pmin3}$ 417c away from the location on negative power supply network 467b that mask-share domain B 413b is connected, when measured along the shortest path along negative power supply network 467b between mask-share domain A 413a and mask-share domain B 413b.

Mask-share domain A 413a is physically spaced apart, as measure along the shortest path of negative power supply network 467b, from all of the circuitry of mask-share domain B 413b by the minimum distance of $d_{pmin3}$ 417c in order to reduce the signal coupling via the negative power supply network 467b between nodes in mask-share domain A 413a and nodes in mask-share domain B 413b.

In an embodiment, when mask-share domain A 413a and mask-share domain B 413b are operated concurrently, because they share a common on-chip negative power-supply network 467b, it is possible that a significant amount of statistical information can be communicated between mask-share domain A 413a and mask-share domain B 413b that exceeds a preferred threshold. In other words, since mask-share domain A 413a and mask-share domain B 413b are both connected to negative power supply network 467b, coupling between mask-share domain A 413a and mask-share domain B 413b via negative power supply network 467b cannot be completely eliminated. Thus, a minimum distance of $d_{pmin3}$ 417c is selected to meet an information transfer goal. This goal may be, for example, the number of power-supply traces required (e.g., using differential power-analysis techniques) to reconstruct the unshared (i.e., original or unmasked) value. It should be understood that the selection of $d_{pmin3}$ 417c may be based on the distance $d_{p3a}$ 417a along negative power supply network 467b from mask-share domain A 413a to power supply pad 434b, the distance $d_{p3b}$ 417b along negatice power supply network 467b from mask-share domain B 413b to power supply pad 435b, or a combination of both.

The minimum distance of $d_{pmin3}$ 417c may be ensured in a variety of ways familiar to those skilled in the art of chip design, including by manual layout and/or automated place-and-route software. For example, in an embodiment, the minimum distance of $d_{pmin3}$ 417c may be ensured by specifying minimum distance of $d_{pmin3}$ 417c as a design rule enforced by automated place and route software and then checked by automated design rule checking software.

Figure 5:
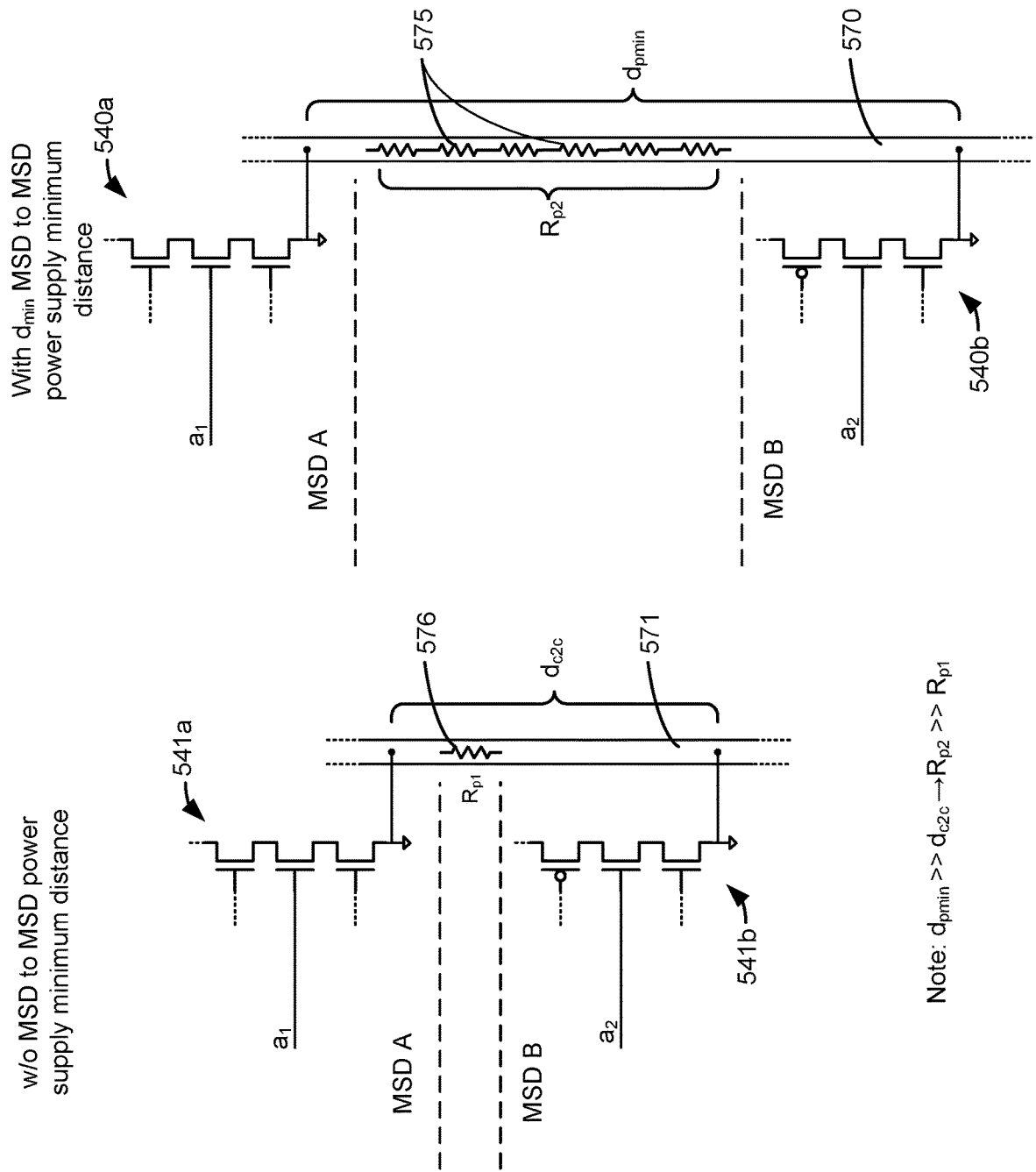
FIG. 5 is an illustration of power supply coupling between mask-share domains.

FIG. 5 is an illustration of power supply coupling between mask-share domains. The left side of FIG. 5 illustrates mask-share domain A circuitry 541a and mask-share domain B circuitry 541b. The right side of FIG. 5 illustrates mask-share domain A circuitry 540a and mask-share domain B circuitry 540b.

On the left side of FIG. 5, mask-share domain A circuitry 541a includes node $a_1$. Mask-share domain B circuitry 541b includes node $a_2$. Both mask-share domain A circuitry 541a and mask-share domain B circuitry 541b are connected to power supply network 571. The connections of mask-share domain A circuitry 541a and mask-share domain B circuitry 541b to power supply network 571 are separated, as measured along power supply network 571, by $d_{c2c}$. In an embodiment, because mask-share domain A circuitry 541a and mask-share domain B circuitry 541b are not subject to a minimum distance rule between connections to power supply network 571, the connection of mask-share domain A 541a may be as close to the connection of mask-share domain B 541b as the integrated circuit manufacturing process allows. This minimum spacing results in a parasitic resistance of $R_{p1}$ 576 between the power supplies of mask-share domain A circuitry 541a and mask-share domain B circuitry 541b, as illustrated in FIG. 5.

On the right side of FIG. 5, mask-share domain A circuitry 540a includes node $a_1$. Mask-share domain B circuitry 540b includes node $a_2$. Both mask-share domain A circuitry 540a and mask-share domain B circuitry 540b are connected to power supply network 570. The connections of mask-share domain A circuitry 540a and mask-share domain B circuitry 540b to power supply network 570 are separated, as measured along power supply network 570, by $d_{pmin}$. In an embodiment, because mask-share domain A circuitry 540a and mask-share domain B540b circuitry are subject to a minimum distance rule between connections to power supply network 570, the connection of mask-share domain A circuitry 540a to the connection of mask-share domain B circuitry 540b may be no less than $d_{pmin}$. This larger minimum distance results in a larger parasitic resistance of $R_{p2}$ 575 between the power supplies of mask-share domain A circuitry 540a and mask-share domain B circuitry 540b, as illustrated in FIG. 5.

It should be understood that since the resistance along a conductors is proportional to the distance along the conductor, when $d_{pmin}$ is selected to be much greater than $d_{c2c}$ (i.e., $d_{pmin} \gg d_{c2c}$), then the parasitic resistance $R_{p2}$ 575 is much greater than the parasitic resistance $R_{p1}$ 576 (i.e., $R_{p2} \gg R_{p1}$). The greater the resistance between the power supply connections of mask-share domains 540a-540b, the less information is transferred between mask-share domains 540a-540b via the power supply network 570.

Figure 6:
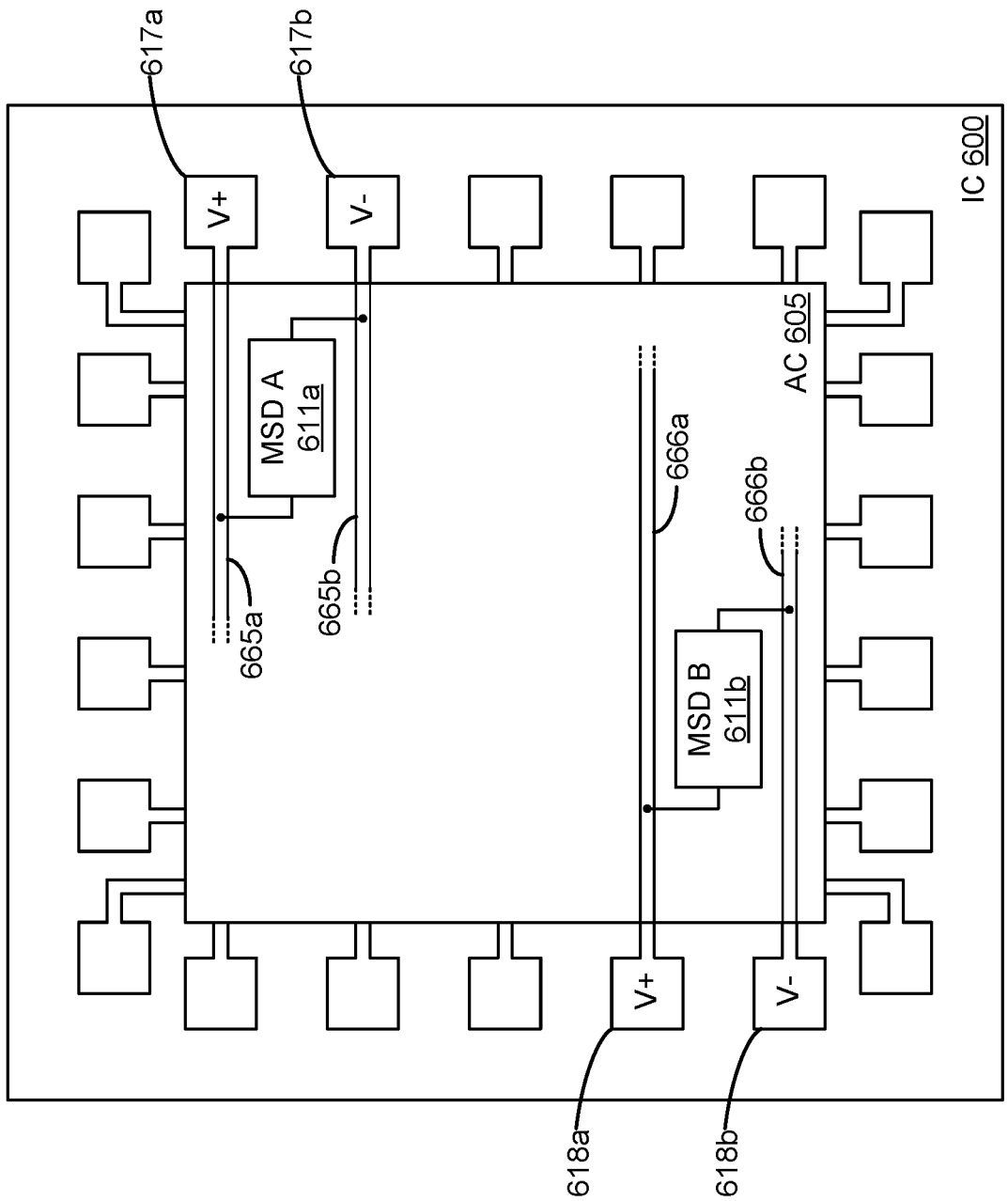
FIG. 6 is an illustration of an integrated circuit with multiple power supply domains.

FIG. 6 is an illustration of an integrated circuit with multiple power supply domains. In FIG. 6, integrated circuit 600 includes active circuitry 605. Active circuitry 605 includes at least mask-share domain A 611a and mask-share domain B 611b. Mask-share domain A 611a is connected to power supply network 665a-665b. Positive power supply network 665a receives a positive supply voltage V+ via power supply pad 617a. Negative power supply network 665b receives a negative supply voltage (or ground) V− via power supply pad 617b. Mask-share domain B 611b is connected to power supply network 666a-666b. Positive power supply network 666a receives a positive supply voltage V+ via power supply pad 618a. Negative power supply network 666b receives a negative supply voltage (or ground) V− via power supply pad 618b. Thus, mask-share domain 611a and mask-share domain B 611b are connected to different on-chip power-supply domains. This separation of power supply domains (e.g., that are supplied by different external connection power supply pad sets 617a-617b, 618a-618b) reduces information transfer between mask-share domain 611a and mask-share domain B 611b via an on-chip power supply network.

In an embodiment, power supply network 665a-665b and power supply network 666a-666b may be connected to on-chip bypassing. Power supply network 665a-665b and power supply network 666a-666b may be connected to different, unconnected, on-chip bypassing (not shown in FIG. 6). Additionally, in FIG. 6, power supply network 665a-665b and power supply network 666a-666b are shown connected to the same number of power supply pad sets 617a-617b, 618a-618b. However, this is merely an example. Power supply network 665a-665b and power supply network 666a-666b may be connected to different numbers of power supply pad sets 617a-617b, 618a-618b. Additionally, in an embodiment, mask-share domain 611a and mask-share domain B 611b may utilize different sets of interconnect layers internally to mask-share domain A 611a and mask-share domain B 611b. For example, the interconnect for mask-share domain A might principally use first and second layer metal (a.k.a, "metal 1" and "metal 2") while the interconnect for mask-share domain B might principally use the first and third metal layers (i.e., "metal 1" and "metal 3"). By using substantially different interconnect layers, the parasitic cross-coupling of signals within the two mask-share domains will be different, and the coupling between the two domains will be reduced. By the use of each of these three approaches (on-chip bypassing, different number of power-supply pads, and different metal layers), the amount of statistical information communicated between mask-share domain A and mask-share domain B can be reduced below a selected threshold.

Figure 7:
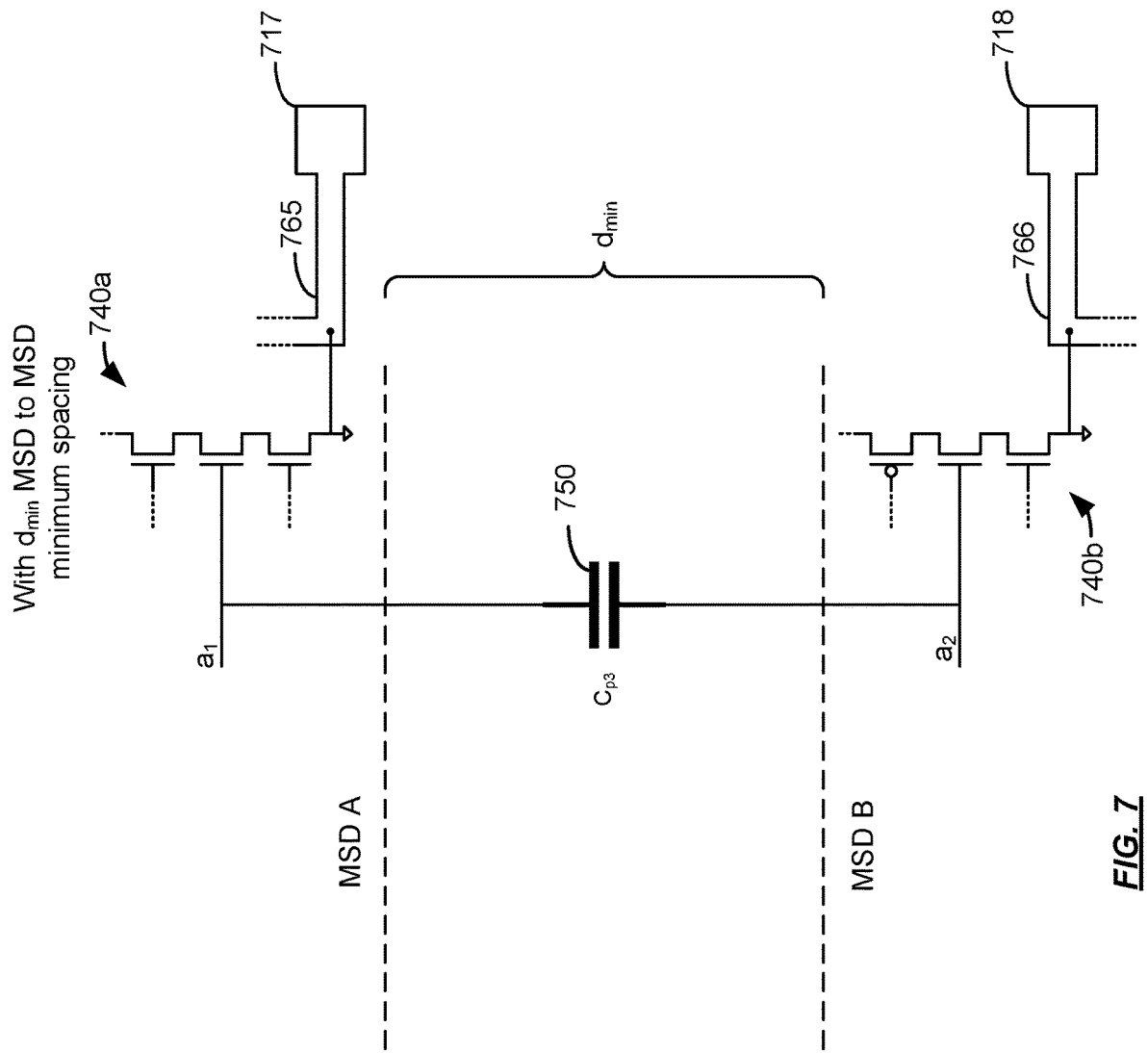
FIG. 7 is an illustration of cross-coupling between mask-share domains that are in different power supply domains.

FIG. 7 is an illustration of cross-coupling between mask-share domains that are in different power supply domains. In FIG. 7, mask-share domain A circuitry 740a includes node $a_1$. Mask-share domain B circuitry 740b includes node $a_2$. Mask-share domain A circuitry 740a is connected to power supply network 765. Power supply network 765 is connected to an external power supply via pad 717. Mask-share domain B circuitry 740b is connected to power supply network 766. Power supply network 766 is connected to an external power supply via pad 718. Power supply network 765 and power supply network 766 are not connected to each other via an on-chip connection.

In an embodiment, mask-share domain A circuitry 740a and mask-share domain B circuitry 740b are subject to a minimum distance rule of $d_{min}$ between mask-share domains. Thus, node $a_1$ of mask-share domain A circuitry 740a may only be as close to node $a_2$ of mask-share domain B circuitry 740b as drain. This minimum spacing results in a parasitic capacitance between node $a_1$ and node as of $C_{p3}$ 750 as illustrated in FIG. 7. Since the capacitance between two conductors is inversely proportional to the distance between the conductors, $d_{min}$ may be problematically selected such that, when mask-share domain A and mask-share domain B are operated concurrently, the amount of electromagnetic cross-coupling between mask-share domain A and mask-share domain B transfers an amount of statistical information between mask-share domain A and mask-share domain B that exceeds a selected threshold. In other words, since cross-coupling between mask-share domain A and mask-share domain B cannot be completely eliminated, minimum distance of $d_{min}$ may be selected to meet an information transfer goal. This goal may be, for example, the number of power-supply traces required (e.g., using differential power-analysis techniques) to reconstruct the unshared (i.e., original or unmasked) value.

Figure 8:
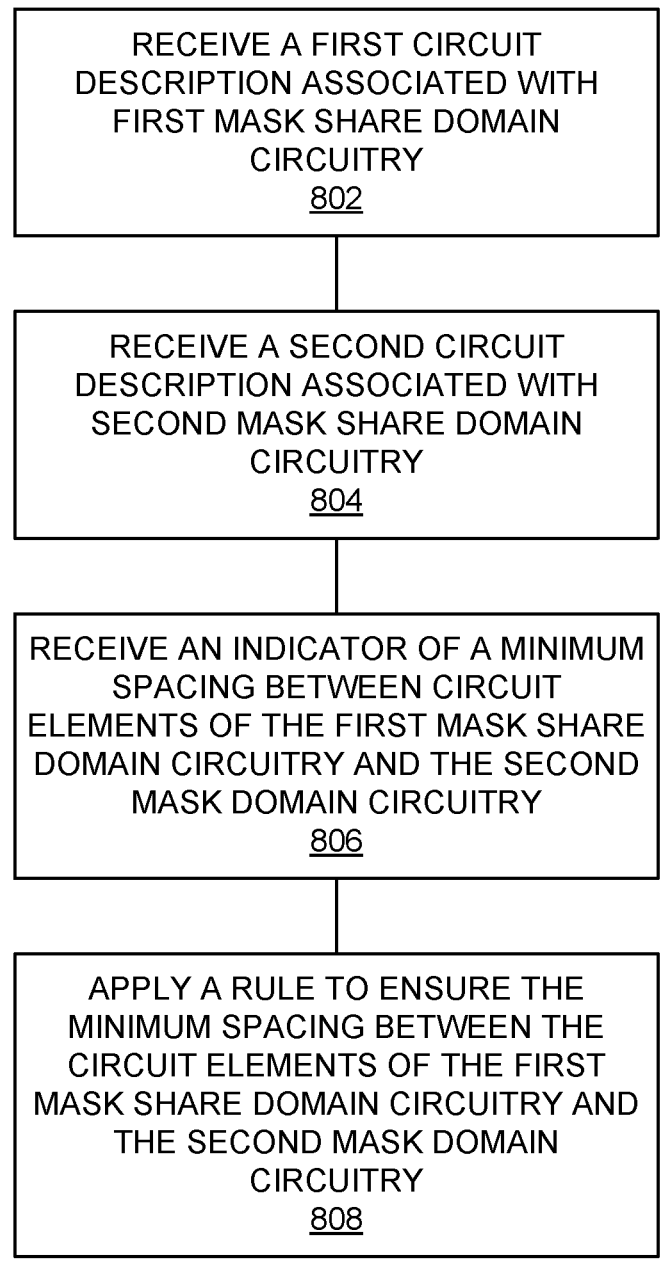
FIG. 8 is a flowchart illustrating a method of reducing information leakage between mask-share domains.

FIG. 8 is a flowchart illustrating a method of reducing information leakage between mask-share domains. The steps illustrated in FIG. 8 may be performed during the design of one or more of integrated circuit 100, masked computation system 200, masked share domain A circuitry 340a, masked share domain B circuitry 340b, integrated circuit 400, integrated circuit 401, integrated circuit 402, masked share domain A circuitry 540a, masked share domain B circuitry 540b, integrated circuit 600, masked share domain A circuitry 740a, masked share domain B circuitry 440b, and/or their components. A first circuit description associated with first mask-share domain circuitry is received (802). For example, design rule checking software may receive a circuit description of masked share domain A 111a.

A second circuit description associated with second mask-share domain circuitry is received (804). For example, the design rule checking software may receive a circuit description of masked share domain B 111*b*. An indicator of a minimum spacing between circuit elements of the first mask-share domain circuitry and the second mask domain circuitry is received (806). For example, the design rule checking software may receive an indicator of $d_{min}$ 115.

A rule is applied to ensure the minimum spacing between the circuit elements of the first mask-share domain circuitry and the second mask domain circuitry (808). For example, the design rule checking software may compute the minimum distance between all of the elements of masked share domain A 111*a* and all of the elements of masked share domain B 111*b*. If any of those computed distances is less than $d_{min}$ 115, the design rule checking software may report a violation of the minimum spacing design rule.

Figure 9:
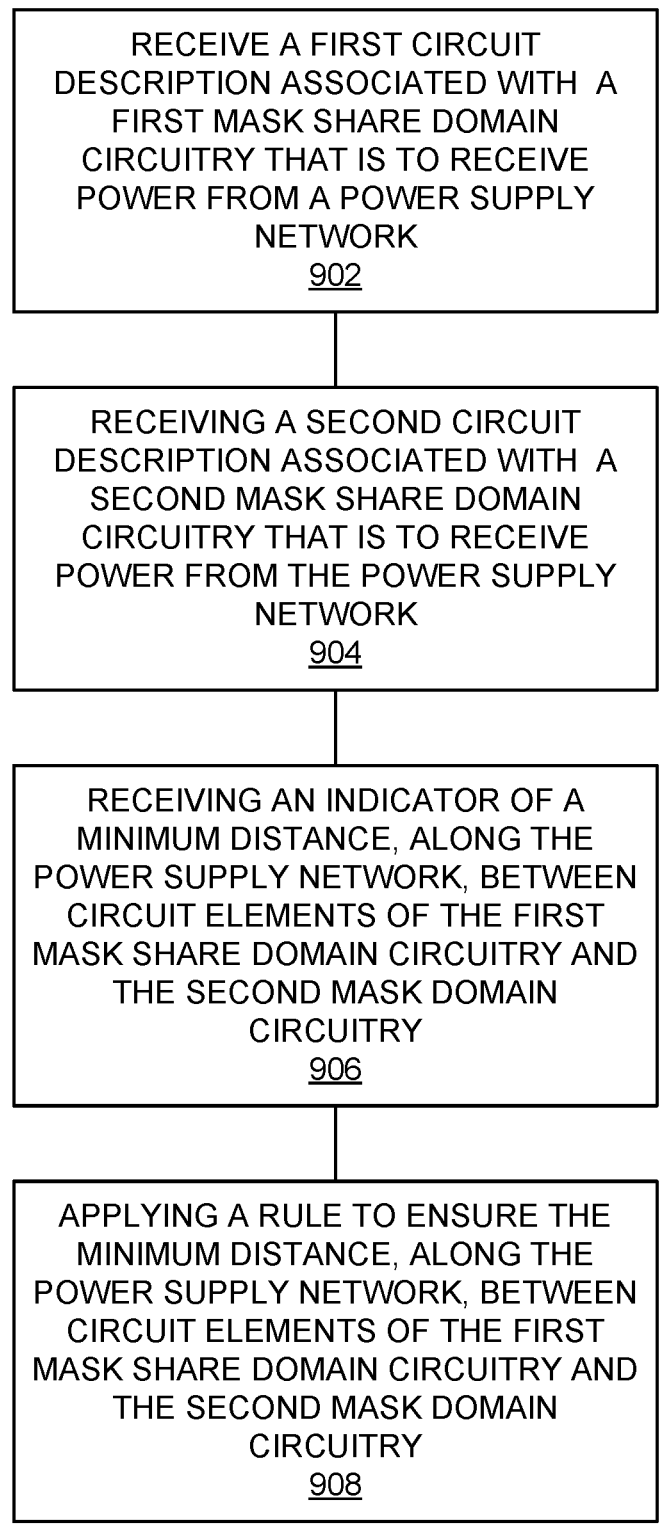
FIG. 9 is a flowchart illustrating a method of reducing information leakage between mask-share domains via a common power supply network.

FIG. 9 is a flowchart illustrating a method of reducing information leakage between mask-share domains via a common power supply network. The steps illustrated in FIG. 9 may be performed during the design of one or more of integrated circuit 100, masked computation system 200, masked share domain A circuitry 340*a*, masked share domain B circuitry 340*b*, integrated circuit 400, integrated circuit 401, integrated circuit 402, masked share domain A circuitry 540*a*, masked share domain B circuitry 540*b*, integrated circuit 600, masked share domain A circuitry 740*a*, masked share domain B circuitry 740*b*, and/or their components. A first circuit description associated with first mask-share domain circuitry that is to receive power from a power supply network is received (902). For example, design rule checking software may receive a circuit description of masked share domain A 411*a*.

A second circuit description associated with second mask-share domain circuitry that is to receive power from the power supply network is received (904). For example, the design rule checking software may receive a circuit description of masked share domain B 411*b*. An indicator of a minimum distance, along the power supply network, between circuit elements of the first mask-share domain circuitry and the second mask domain circuitry is received (906). For example, the design rule checking software may receive an indicator of $d_{pmin}$ 415.

A rule is applied to ensure the minimum distance, along the power supply network, between the circuit elements of the first mask-share domain circuitry and the second mask domain circuitry (908). For example, the design rule checking software may compute the minimum distance, along power supply network 465*a*-465*b*, between all of the elements of masked share domain A 411*a* and all of the elements of masked share domain B 411*b*. If any of those computed distances is less than $d_{pmin}$ 415, the design rule checking software may report a violation of the minimum distance design rule.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of integrated circuit 100, masked computation system 200, masked share domain A circuitry 340*a*, masked share domain B circuitry 340*b*, integrated circuit 400, integrated circuit 401, integrated circuit 402, masked share domain A circuitry 540*a*, masked share domain B circuitry 540*b*, integrated circuit 600, masked share domain A circuitry 740*a*, and/or masked share domain B circuitry 740*b*, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 10:
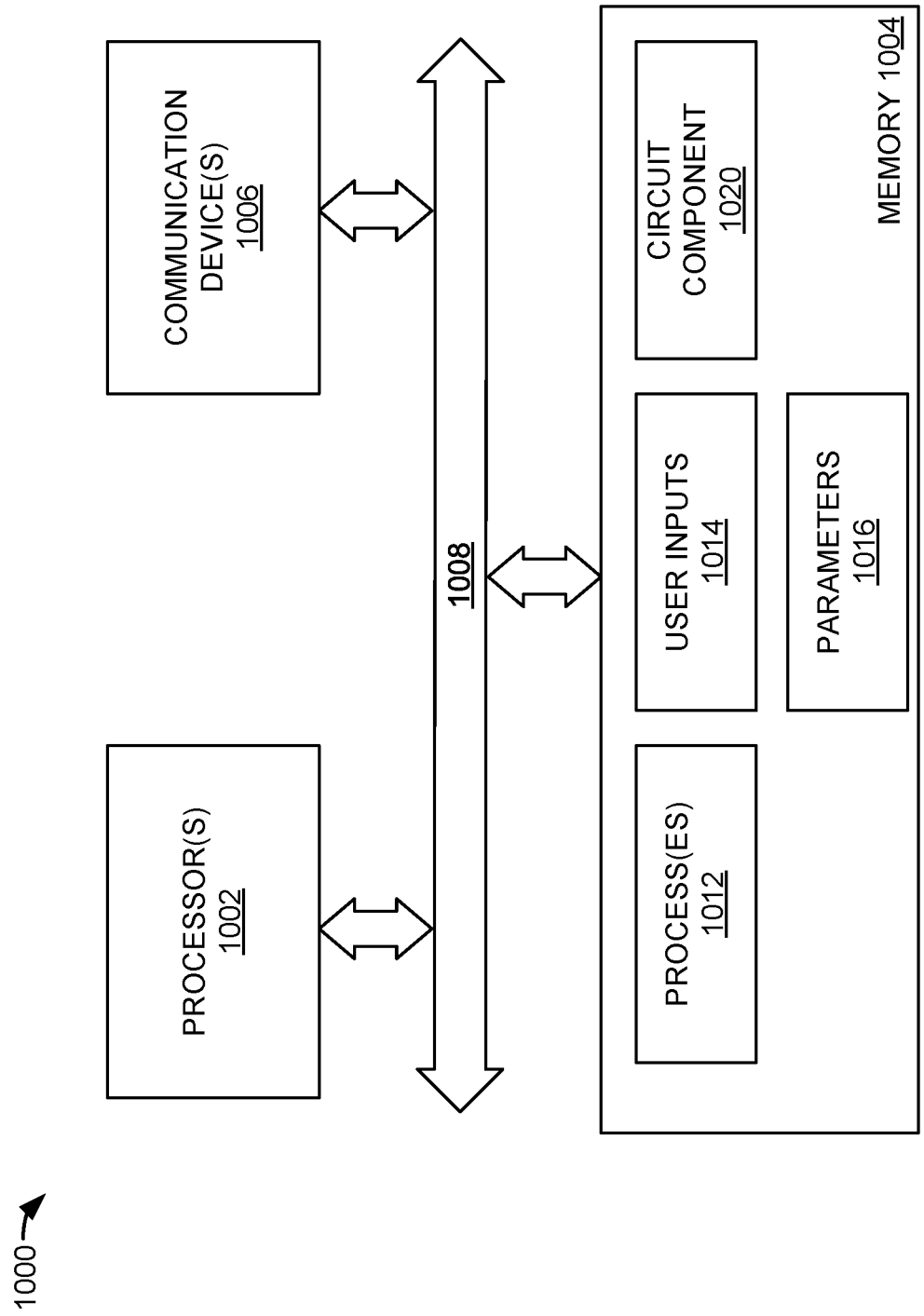
FIG. 10 is a block diagram of a processing system.

FIG. 10 is a block diagram illustrating one embodiment of a processing system 1000 for including, processing, or generating, a representation of a circuit component 1020. Processing system 1000 includes one or more processors 1002, a memory 1004, and one or more communications devices 1006. Processors 1002, memory 1004, and communications devices 1006 communicate using any suitable type, number, and/or configuration of wired and/or wireless connections 1008.

Processors 1002 execute instructions of one or more processes 1012 stored in a memory 1004 to process and/or generate circuit component 1020 responsive to user inputs 1014 and parameters 1016. Processes 1012 may be any suitable electronic design automation (EDA) tool or portion thereof used to design, simulate, analyze, and/or verify electronic circuitry and/or generate photomasks for electronic circuitry. Representation 1020 includes data that describes all or portions of integrated circuit 100, masked computation system 200, masked share domain A circuitry 340*a*, masked share domain B circuitry 340*b*, integrated circuit 400, integrated circuit 401, integrated circuit 402, masked share domain A circuitry 540*a*, masked share domain B circuitry 540*b*, integrated circuit 600, masked share domain A circuitry 740*a*, and/or masked share domain B circuitry 740*b* and their components, as shown in the Figures.

Representation 1020 may include one or more of behavioral, register transfer, logic component, transistor, and layout geometry-level descriptions. Moreover, representation 1020 may be stored on storage media or communicated by carrier waves.

Data formats in which representation 1020 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 1014 may comprise input parameters from a keyboard, mouse, voice recognition interface, microphone and speakers, graphical display, touch screen, or other type of user interface device. This user interface may be distributed among multiple interface devices. Parameters 1016 may include specifications and/or characteristics that are input to help define representation 1020. For example, parameters 1016 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 1004 includes any suitable type, number, and/or configuration of non-transitory computer-readable storage media that stores processes 1012, user inputs 1014, parameters 1016, and circuit component 1020.

Communications devices 1006 include any suitable type, number, and/or configuration of wired and/or wireless devices that transmit information from processing system 1000 to another processing or storage system (not shown) and/or receive information from another processing or storage system (not shown). For example, communications devices 1006 may transmit circuit component 1020 to another system. Communications devices 1006 may receive processes 1012, user inputs 1014, parameters 1016, and/or circuit component 1020 and cause processes 1012, user inputs 1014, parameters 1016, and/or circuit component 1020 to be stored in memory 1004.

Implementations discussed herein include, but are not limited to, the following examples:

Example 1: An integrated circuit, comprising: first circuitry that implements a masked computation from a first masked data representation; second circuitry that implements the masked computation for a second masked data representation, wherein non-random statistical information about an unmasked data representation used to derive the first masked data representation and the second masked data representation is unavailable from a proper subset of the first masked data representation and the second masked data representation; and, the first circuitry and the second circuitry physically separated by at least a first minimum distance.

Example 2: The integrated circuit of example 1, wherein the first minimum distance results, when the first circuitry and the second circuitry are operated concurrently, in a first cross-coupling, between the first circuitry and the second circuitry, that transfers an amount of statistical information between the first circuitry and the second circuitry that is below a selected threshold.

Example 3: The integrated circuit of example 1, wherein the unmasked data representation is obtained using at least a bitwise exclusive-OR of first masked data representation and the second masked data representation.

Example 4: The integrated circuit of example 1, wherein the unmasked data representation is obtained using at least an arithmetic sum of first masked data representation and the second masked data representation.

Example 5: The integrated circuit of example 1, wherein the first circuitry is powered by a first power supply network on the integrated circuit, the second circuitry is powered by a second power supply network on the integrated circuit, and the first power supply network and the second power supply network are physically separated by at least a second minimum distance, the second minimum distance resulting in coupling between the first power supply network and the second power supply network that transfers an amount of statistical information between the first circuitry and the second circuitry that is below a selected threshold.

Example 6: The integrated circuit of example 1, wherein the first circuitry and the second circuitry share a power supply network on the integrated circuit.

Example 7: The integrated circuit of example 6, wherein a first shortest distance along the power supply network from the first circuitry to the second circuitry is a least a second minimum distance.

Example 8: An integrated circuit, comprising: first circuitry that implements a masked computation from a first masked data representation; second circuitry that implements the masked computation for a second masked data representation, wherein non-random statistical information about an unmasked data representation used to derive the first masked data representation and the second masked data representation is unavailable from a proper subset of the first masked data representation and the second masked data representation; and, the first circuitry and the second circuitry sharing a power supply network on the integrated circuit, a first shortest distance along the power supply network from the first circuitry to the second circuitry being a least a first minimum distance.

Example 9: The integrated circuit of example 8, wherein the first minimum distance results, when the first circuitry and the second circuitry are operated concurrently, in a first coupling, between the first circuitry and the second circuitry via the power supply network, that transfers an amount of statistical information between the first circuitry and the second circuitry that is below a selected threshold.

Example 10: The integrated circuit of example 8, wherein the unmasked data representation is obtained using at least a bitwise exclusive-OR of first masked data representation and the second masked data representation.

Example 11: The integrated circuit of example 8, wherein the unmasked data representation is obtained using at least an arithmetic sum of first masked data representation and the second masked data representation.

Example 12: The integrated circuit of example 8, wherein the power supply network is connected to a first off-chip power supply connection pad set and a second off-chip power supply connection pad set, the first off-chip power supply connection pad set being a first distance along the power supply network from the first circuitry, the second off-chip power supply connection pad set being a second distance along the power supply network from the second circuitry.

Example 13: The integrated circuit of example 12, wherein the first distance and the second distance are less than the first shortest distance.

Example 14: The integrated circuit of example 12, wherein the first off-chip power supply connection pad set is a third distance along the power supply network from second power supply and the first distance and the second distance are less than the third distance.

Example 15. An integrated circuit, comprising: first circuitry, powered by a first power supply network on the integrated circuit, that implements a masked computation from a first masked data representation; and, second circuitry, powered by a second power supply network on the integrated circuit, that implements the masked computation for a second masked data representation, wherein non-random statistical information about an unmasked data representation used to derive the first masked data representation and the second masked data representation is unavailable from a proper subset of the first masked data representation and the second masked data representation.

Example 16: The integrated circuit of example 15, wherein the first circuitry and the second circuitry are physically separated by at least a first minimum distance.

Example 17: The integrated circuit of example 16, wherein the first power supply network is connected to a first off-chip power supply connection pad set and the second power supply network is connected a second off-chip power supply connection pad set, the first off-chip power supply connection pad set being a first distance along the first power supply network from the first circuitry, the second off-chip power supply connection pad set being a second distance along the second power supply network from the second circuitry, the first distance and the second distance being less than the first minimum distance.

Example 18: The integrated circuit of example 15, wherein the first power supply network and the second power supply network are physically separated by at least a first minimum distance, the first minimum distance resulting in coupling between the first power supply network and the second power supply network that transfers an amount of statistical information between the first circuitry and the second circuitry that is below a selected threshold.

Example 19: The integrated circuit of example 15, wherein the unmasked data representation is obtained using at least a bitwise exclusive-OR of first masked data representation and the second masked data representation.

Example 20: The integrated circuit of example 15, wherein the unmasked data representation is obtained using at least an arithmetic sum of first masked data representation and the second masked data representation.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An integrated circuit, comprising:
    first circuitry that implements a masked computation from a first masked data representation;
    second circuitry that implements the masked computation for a second masked data representation, wherein non-random statistical information about an unmasked data representation used to derive the first masked data representation and the second masked data representation is unavailable from a proper subset of the first masked data representation and the second masked data representation; and,
    the first circuitry and the second circuitry physically separated by at least a first minimum distance.

2. The integrated circuit of claim 1, wherein the first minimum distance results, when the first circuitry and the second circuitry are operated concurrently, in a first cross-coupling, between the first circuitry and the second circuitry, that transfers an amount of statistical information between the first circuitry and the second circuitry that is below a selected threshold.

3. The integrated circuit of claim 1, wherein the unmasked data representation is obtained using at least a bitwise exclusive-OR of first masked data representation and the second masked data representation.

4. The integrated circuit of claim 1, wherein the unmasked data representation is obtained using at least one of an arithmetic mapping, multiplicative mapping, and affine mapping.

5. The integrated circuit of claim 1, wherein the first circuitry is powered by a first power supply network on the integrated circuit, the second circuitry is powered by a second power supply network on the integrated circuit, and the first power supply network and the second power supply network are physically separated by at least a second minimum distance, the second minimum distance resulting in coupling between the first power supply network and the second power supply network that transfers an amount of statistical information between the first circuitry and the second circuitry that is below a selected threshold.

6. The integrated circuit of claim 1, wherein the first circuitry and the second circuitry share a power supply network on the integrated circuit.

7. The integrated circuit of claim 6, wherein a first shortest distance along the power supply network from the first circuitry to the second circuitry is a least a second minimum distance.

8. An integrated circuit, comprising:
    first circuitry that implements a masked computation from a first masked data representation;
    second circuitry that implements the masked computation for a second masked data representation, wherein non-random statistical information about an unmasked data representation used to derive the first masked data representation and the second masked data representation is unavailable from a proper subset of the first masked data representation and the second masked data representation; and,
    the first circuitry and the second circuitry sharing a power supply network on the integrated circuit, a first shortest physical distance along the power supply network from the first circuitry to the second circuitry being at least a first minimum distance.

9. The integrated circuit of claim 8, wherein the first minimum distance results, when the first circuitry and the second circuitry are operated concurrently, in a first coupling, between the first circuitry and the second circuitry via the power supply network, that transfers an amount of statistical information between the first circuitry and the second circuitry that is below a selected threshold.

10. The integrated circuit of claim 8, wherein the unmasked data representation is obtained using at least a bitwise exclusive-OR of first masked data representation and the second masked data representation.

11. The integrated circuit of claim 8, wherein the unmasked data representation is obtained using at least an arithmetic sum of first masked data representation and the second masked data representation.

12. The integrated circuit of claim 8, wherein the power supply network is connected to a first off-chip power supply connection pad set and a second off-chip power supply connection pad set, the first off-chip power supply connection pad set being a first distance along the power supply network from the first circuitry, the second off-chip power supply connection pad set being a second distance along the power supply network from the second circuitry.

13. The integrated circuit of claim 12, wherein the first distance and the second distance are less than the first shortest physical distance.

14. The integrated circuit of claim 12, wherein the first off-chip power supply connection pad set is a third distance along the power supply network from second power supply and the first distance and the second distance are less than the third distance.

15. An integrated circuit, comprising:
first circuitry, powered by a first power supply network on the integrated circuit, that implements a masked computation from a first masked data representation; and,
second circuitry, powered by a second power supply network on the integrated circuit, that implements the masked computation for a second masked data representation, wherein non-random statistical information about an unmasked data representation used to derive the first masked data representation and the second masked data representation is unavailable from a proper subset of the first masked data representation and the second masked data representation, the first power supply network and the second power supply network are supplied by different external connection power supply pad sets.

16. The integrated circuit of claim 15, wherein the first circuitry and the second circuitry are physically separated by at least a first minimum distance.

17. The integrated circuit of claim 16, wherein the first power supply network is connected to a first off-chip power supply connection pad set and the second power supply network is connected a second off-chip power supply connection pad set, the first off-chip power supply connection pad set being a first physical distance along the first power supply network from the first circuitry, the second off-chip power supply connection pad set being a second physical distance along the second power supply network from the second circuitry, the first physical distance and the second physical distance being less than the first minimum distance.

18. The integrated circuit of claim 15, wherein the first power supply network and the second power supply network are physically separated by at least a first minimum distance, the first minimum distance resulting in coupling between the first power supply network and the second power supply network that transfers an amount of statistical information between the first circuitry and the second circuitry that is below a selected threshold.

19. The integrated circuit of claim 15, wherein the unmasked data representation is obtained using at least a bitwise exclusive-OR of first masked data representation and the second masked data representation.

20. The integrated circuit of claim 15, wherein the unmasked data representation is obtained using at least an arithmetic sum of first masked data representation and the second masked data representation.

* * * * *